(12) United States Patent
Nishida et al.

(10) Patent No.: US 8,489,116 B2
(45) Date of Patent: Jul. 16, 2013

(54) MOBILE COMMUNICATION METHOD, MOBILE MANAGEMENT NODE, POSITIONING CALCULATION NODE, AND MOBILE STATION

(75) Inventors: Katsutoshi Nishida, Tokyo (JP); Zhen Miao, Yokohama (JP); Minami Ishii, Yokohama (JP); Wuri Andarmawanti Hapsari, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/500,022

(22) PCT Filed: Oct. 7, 2010

(86) PCT No.: PCT/JP2010/067620
§ 371 (c)(1),
(2), (4) Date: May 22, 2012

(87) PCT Pub. No.: WO2011/043406
PCT Pub. Date: Apr. 14, 2011

(65) Prior Publication Data
US 2012/0225647 A1    Sep. 6, 2012

(30) Foreign Application Priority Data

Oct. 7, 2009    (JP) ............................... P2009-233941

(51) Int. Cl.
*H04W 24/00*    (2009.01)
*H04W 36/00*    (2009.01)

(52) U.S. Cl.
USPC ...................... 455/456.1; 455/436

(58) Field of Classification Search
USPC ............................ 455/404.2, 456.1, 436–448
See application file for complete search history.

(56) References Cited

U.S. PATENT DOCUMENTS

2008/0139206 A1*    6/2008    Touray et al. ................. 455/437

OTHER PUBLICATIONS

3GPP TS 36.305 V9.0.0, Sep. 2009, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)," 52 pages.

(Continued)

*Primary Examiner* — Temica M Beamer
*Assistant Examiner* — Joel Ajayi
(74) *Attorney, Agent, or Firm* — Osha Liang LLP

(57) ABSTRACT

To eliminate the problems when a handover by a mobile station UE over a radio base station eNodeB is performed during a positioning process of the mobile station UE. A mobile management node MME according to the present invention is configured to transmit a transfer signal "S1-AP Downlink NAS Transport" including an LPP signal received from a positioning calculation node E-SMLC and the identification information of the E-SMLC to a radio base station eNodeB, and when a transmission failure reason included in a transmission failure notification signal "S1-AP NON DELIVERY INDICATION" received from the radio base station eNodeB indicates a positioning failure, the mobile management node MME transmits the transmission failure reason and the LPP signal included in the transmission failure notification signal "S1-AP NON DELIVERY INDICATION" to the positioning calculation node E-SMLC identified by the identification information of the E-SMLC included in the transmission failure notification signal.

5 Claims, 8 Drawing Sheets

OTHER PUBLICATIONS

3GPP TS 36.413 V9.0.0, Sep. 2009, "3rd Generation Partnership Project; Technical Specification Group Radio Access Network; Evolved Universal Terrestrial Radio Access Network (E-UTRAN); S1 Application Protocol (S1AP) (Release 9)," 227 pages.

3GPP TS 23.271 V9.1.0, Sep. 2009, "3rd Generation Partnership Project; Technical Specification Group Services and System Aspects; Functional stage 2 description of Location Services (LCS) (Release 9)," 166 pages.

HTC Corporation, "LPP PDU transmission," 3GPP TSG-RAN WG2 #67, R2-094907, Shenzhen, China, Aug. 24-28, 2009, 2 pages.

NTT DOCOMO, Inc., "LPP PDU Retransmission," 3GPP TSG-RAN WG2 #67bis, R2-095554, Miyazaki, Japan, Oct. 12-16, 2009, 4 pages.

Qualcomm Europe, "LPP Reliable Transport," 3GPP TSG-RAN WG2 #68, R2-096972, Jeju, Korea, Nov. 9-13, 2009, 9 pages.

3GPP TS 36.331 V10.5.0, Mar. 2013, "3rd Generation Partnership Project; Technical Specification Group Radio Access Network; Evolved Universal Terrestrial Radio Access Network (E-UTRAN); Radio Resource Control (RRC); Protocol specification (Release 10)," 302 pages.

3GPP TS 29.171 V11.1.0, Mar. 2012, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); Sls interface (Release 11)," 51 pages.

International Search Report issued in PCT/JP2010/067620, mailed on Dec. 14, 2010, with translation, 4 pages.

* cited by examiner

MOBILE COMMUNICATION METHOD, MOBILE MANAGEMENT NODE, POSITIONING CALCULATION NODE, AND MOBILE STATION

TECHNICAL FIELD

The present invention relates to a mobile communication method, a mobile management node, a positioning calculation node, and a mobile station.

BACKGROUND ART

A mobile communication system of an LTE (Long Term Evolution) scheme, which is defined by the 3GPP, is configured to enable realization of a location information provision service (LCS: LoCation Services) that provides the location information of a mobile station UE by using LPP (LTE Positioning Protocol), as shown in FIG. 8.

However, the aforementioned mobile communication system has a problem such that when a handover by a mobile station UE over a radio base station eNodeB is performed during a positioning process of the mobile station UE, an LPP signal (LPP-PDU) cannot be retransmitted.

Another problem in the aforementioned mobile communication system is that when an LPP signal is retransmitted, the LPP signal cannot be updated based on the Cell-ID of the handover destination.

SUMMARY OF THE INVENTION

Thus, the present invention has been made in view of the aforementioned problems, and an object thereof is to provide a mobile communication method, a mobile management node, a positioning calculation node, and a mobile station that can eliminate the problems when a handover by a mobile station UE over a radio base station eNodeB is performed during a positioning process of the mobile station UE.

A first characteristic of the present invention is summarized as a mobile communication method including: a step of transmitting, by a positioning calculation node, a positioning signal to a mobile management node; a step of transmitting, by the mobile management node, a transfer signal including the positioning signal and the identification information of the positioning calculation node to a radio base station; a step of transmitting, by the radio base station, a transmission failure notification signal including a transmission failure reason, the positioning signal, and the identification information of the positioning calculation node to the mobile management node, when the radio base station fails to transmit the positioning signal to the mobile station; and a step of transmitting, by the mobile management node, the transmission failure reason and the positioning signal included in the transmission failure notification signal to the positioning calculation node identified by the identification information of the positioning calculation node included in the transmission failure notification signal, when the transmission failure reason included in the transmission failure notification signal received by the mobile management node indicates a positioning failure.

A second characteristic of the present invention is summarized as a mobile management node configured to transmit a transfer signal including a positioning signal received from a positioning calculation node and the identification information of the positioning calculation node to a radio base station, and also configured to transmit a transmission failure reason and the positioning signal included in the transmission failure notification signal to the positioning calculation node identified by the identification information of the positioning calculation node included in the transmission failure notification signal, when the transmission failure reason included in the transmission failure notification signal received from the radio base station indicates a positioning failure.

A third characteristic of the present invention is summarized as a mobile communication method including: a step of transmitting, by a positioning calculation node, a positioning signal to a mobile management node; a step of transmitting, by the mobile management node, a transfer signal including the positioning signal and the identification information of the positioning calculation node to a first radio base station; a step of transmitting, by the first radio base station, a transmission failure notification signal including a transmission failure reason, the positioning signal, and the identification information of the positioning calculation node to the mobile management node, when the first radio base station fails to transmit the positioning signal to the mobile station; a step of starting, by the mobile management node, a predetermined timer when the transmission failure reason included in the transmission failure notification signal received by the mobile management node indicates that a handover is in progress; and a step of transmitting, by the mobile management node, the identification information of a handover-destination cell and the transmission failure reason and the positioning signal included in the transmission failure notification signal to the positioning calculation node identified by the identification information of the positioning calculation node included in the transmission failure notification signal, when the mobile management node receives a predetermined signal including the identification information of the handover-destination cell from a second radio base station before the expiry of the predetermined timer.

A fourth characteristic of the present invention is summarized as a mobile management node configured to transmit a transfer signal including a positioning signal received from a positioning calculation node and the identification information of the positioning calculation node to a first radio base station, and configured to start a predetermined timer when a transmission failure reason included in a transmission failure notification signal received from the first radio base station indicates that a handover is in progress, and also configured to transmit the identification information of a handover-destination cell and the transmission failure reason and the positioning signal included in the transmission failure notification signal to the positioning calculation node identified by the identification information of the positioning calculation node included in the transmission failure notification signal, when a predetermined signal including the identification information of the handover-destination cell is received from a second radio base station before the expiry of the predetermined timer.

A fifth characteristic of the present invention is summarized as a mobile communication method including: a step of transmitting, by a positioning calculation node, a positioning signal to a mobile management node; a step of transmitting, by the mobile management node, a transfer signal including the positioning signal and the identification information of the positioning calculation node to a first radio base station; a step of transmitting, by the first radio base station, a transmission failure notification signal including a transmission failure reason, the positioning signal, and the identification information of the positioning calculation node to the mobile management node, when the first radio base station fails to transmit the positioning signal to the mobile station; a step of starting, by the mobile management node, a predetermined timer when the transmission failure reason included in the transmission failure notification signal received by the mobile management node indicates that a handover is in progress; a step of transmitting, by the mobile management node, the transmission failure reason and the positioning signal included in the transmission failure notification signal to the positioning calculation node identified by the identification information of the positioning calculation node included in the transmission failure notification signal, when the predetermined timer expires before the mobile management node receives a predetermined signal including the identification information of a handover-destination cell from a second radio base station; and a step of updating, by the mobile management node, the retained identification information of the handover-destination cell and also storing information indicating the same, without notifying the identification information of the handover-destination cell to the positioning calculation node, when the mobile management node receives a predetermined signal including the identification information of the handover-destination cell from the second radio base station after the expiry of the predetermined timer.

A sixth characteristic of the present invention is summarized as a mobile management node configured to transmit a transfer signal including a positioning signal received from a positioning calculation node and the identification information of the positioning calculation node to a first radio base station, and configured to start a predetermined timer when a transmission failure reason included in a transmission failure notification signal received from the first radio base station indicates that a handover is in progress, and configured to transmit the transmission failure reason and the positioning signal included in the transmission failure notification signal to the positioning calculation node identified by the identification information of the positioning calculation node included in the transmission failure notification signal, when the predetermined timer expires before a predetermined signal including the identification information of a handover-destination cell is received from a second radio base station, and also configured to update the retained identification information of the handover-destination cell and also store information indicating the same, without notifying the positioning calculation node of the identification information of the handover-destination cell, when a predetermined signal including the identification information of the handover-destination cell is received from the second radio base station after the expiry of the predetermined timer.

A seventh characteristic of the present invention is summarized as a mobile communication method including: a step of transmitting, by a positioning calculation node, a positioning signal to a mobile management node; a step of transmitting, by the mobile management node, a transfer signal including the positioning signal and the identification information of the positioning calculation node to a first radio base station; a step of transmitting, by the first radio base station, a transmission failure notification signal including a transmission failure reason, the positioning signal, and the identification information of the positioning calculation node to the mobile management node, when the first radio base station fails to transmit the positioning signal to the mobile station; a step of transmitting, by the mobile management node, the transmission failure reason and the positioning signal included in the transmission failure notification signal to the positioning calculation node identified by the identification information of the positioning calculation node included in the transmission failure notification signal, when the transmission failure reason included in the transmission failure notification signal received by the mobile management node indicates that a handover is in progress; a step of starting, by the positioning calculation node, a predetermined timer when the positioning calculation node receives the transmission failure reason and the positioning signal from the mobile management node; and a step of transmitting, by the positioning calculation node, a positioning signal corresponding to the identification information of a handover-destination cell to the mobile management node, when the positioning calculation node receives the identification information of the handover-destination cell from a second radio base station by way of the mobile management node, before the expiry of the predetermined timer.

An eighth characteristic of the present invention is summarized as a positioning calculation node configured to transmit a positioning signal to a mobile management node, and configured to start a predetermined timer when a transmission failure reason and the positioning signal included in a transmission failure notification signal transmitted to the mobile management node when the first radio base station fails to transmit the positioning signal to the mobile station are received from the mobile management node, and also configured to transmit a positioning signal corresponding to the identification information of a handover-destination cell to the mobile management node, when the identification information of the handover-destination cell is received from the second radio base station by way of the mobile management node before the expiry of the predetermined timer.

A ninth characteristic of the present invention is summarized as a mobile communication method including: a step of transmitting, by a positioning calculation node, a positioning signal to a mobile management node; a step of transmitting, by the mobile management node, a transfer signal including the positioning signal and the identification information of the positioning calculation node to a first radio base station; a step of transmitting, by the first radio base station, a transmission failure notification signal including a transmission failure reason, the positioning signal, and the identification information of the positioning calculation node to the mobile management node, when the first radio base station fails to transmit the positioning signal to the mobile station; a step of transmitting, by the mobile management node, the transmission failure reason and the positioning signal included in the transmission failure notification signal to the positioning calculation node identified by the identification information of the positioning calculation node included in the transmission failure notification signal, when the transmission failure reason included in the transmission failure notification signal received by the mobile management node indicates that a handover is in progress; and a step of transmitting, by the positioning calculation node, a notification request requesting the notification of the identification information of a handover-destination cell to the mobile station, when the positioning calculation node receives the transmission failure reason and the positioning signal from the mobile management node.

A tenth characteristic of the present invention is summarized as a positioning calculation node configured to transmit a positioning signal to a mobile management node, and also configured to transmit a notification request requesting the notification of identification information of a handover-destination cell to a mobile station when a transmission failure reason and the positioning signal included in a transmission failure notification signal transmitted to the mobile management node when the first radio station fails to transmit the positioning signal to the mobile station are received from the mobile management node.

An eleventh characteristic of the present invention is summarized as a mobile station configured such that when a handover from a first cell subordinate to a first radio base station to a second cell subordinate to a second radio base station is detected, and when a notification request requesting the notification of the identification information of a handover-destination cell is received from a positioning calculation node, the mobile station notifies the positioning calculation node of the identification information of the second cell.

DETAILED DESCRIPTION

Mobile Communication System According to First Embodiment of the Present Invention A mobile communication system according to a first embodiment of the present invention is described with reference to FIG. 1 through FIG. 7.

The mobile communication system according to the present embodiment is configured to be able to provide LCS (location information service) to a mobile station UE. Specifically, the mobile communication system according to the present embodiment is configured to be able to provide "LPP PDU" concerning the mobile station UE to the mobile station UE by using LPP.

Figure 1:
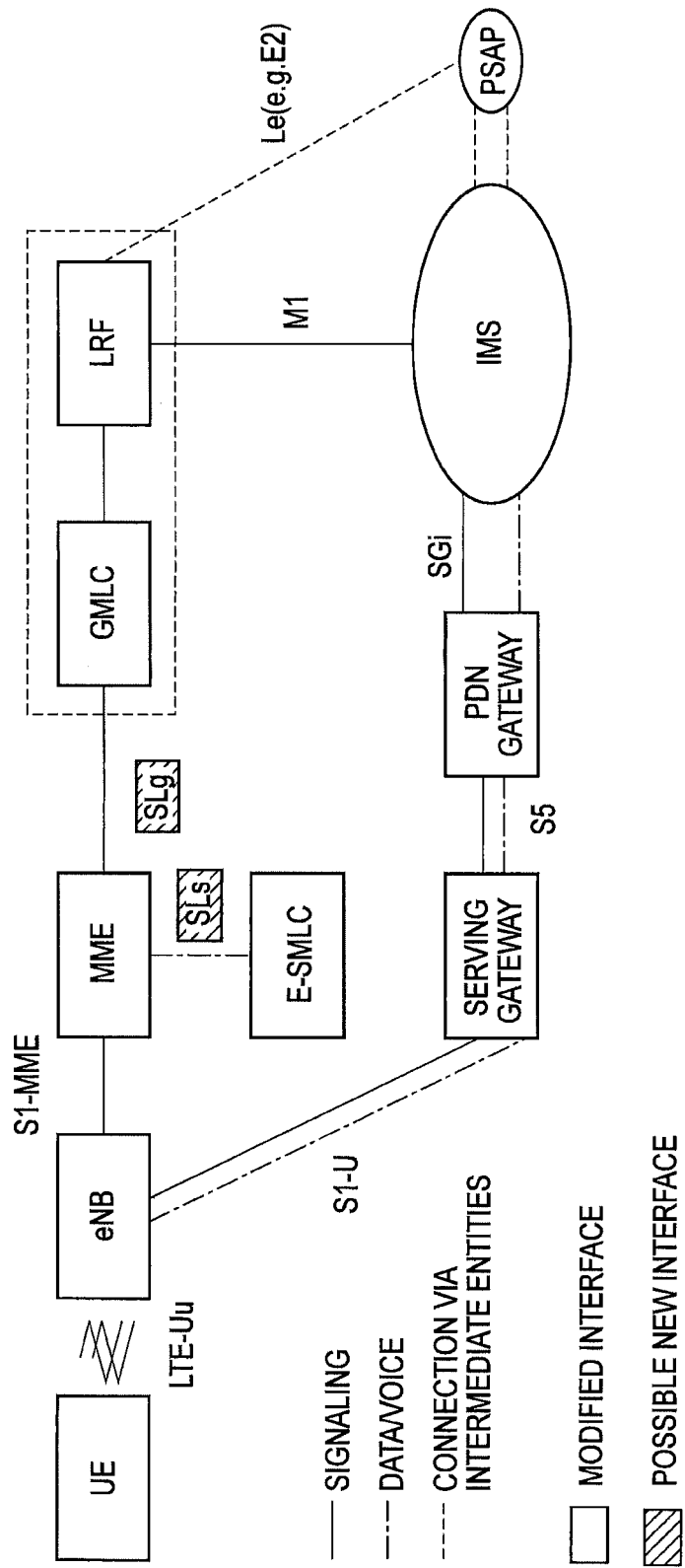
FIG. 1 is a diagram showing the entire configuration of a mobile communication system according to a first embodiment of the present invention.

As shown in FIG. 1, the mobile communication system according to the present embodiment includes a radio base station eNB, a mobile management node MME (Mobility Management Entity), a positioning calculation node E-SMLC, a gateway device S-GW (Serving Gateway), a gateway device P-GW (PDN Gateway), a node GMLC (Gateway Mobile Location Centre), a node LRF (Location Retrieval Function), IMS (IP Multimedia Subsystem), and PSAP (Public Safety Answer Point).

The interface between the mobile station UE and the radio base station eNB is an LTE-Uu interface, which is configured to set a signaling connection and a data signal/voice signal connection between the mobile station UE and the radio base station eNB.

The interface between the radio base station eNB and the gateway device S-GW is an S1-U interface, which is configured to set a signaling connection and a data signal/voice signal connection between the radio base station eNB and the gateway device S-GW.

The interface between the gateway device S-GW and the gateway device P-GW is an S5 interface, which is configured to set a signaling connection and a data signal/voice signal connection between the gateway device S-GW and the gateway device P-GW.

The interface between the gateway device P-GW and the IMS is an SGi interface, which is configured to set a signaling connection and a data signal/voice signal connection between the gateway device P-GW and the IMS.

The interface between the radio base station eNB and the mobile management node MME is an S1-MME interface, which is configured to set a signaling connection between the radio base station eNB and the mobile management node MME.

The interface between the mobile management node MME and the positioning calculation node E-SMLC is an SLs interface, which is configured to set a signaling connection between the mobile management node MME and the positioning calculation node E-SMLC.

The interface between the mobile management node MME and the node GMLC is an SLg interface, which is configured to set a signaling connection between the mobile management node MME and the node GMLC.

The interface between the node LRF and the IMS is an M1 interface, which is configured to set a signaling connection between the node LRF and the IMS.

The interface between the node LRF and the PSAP is an Le (for example, E2) interface, which is configured to set a signaling connection between the node LRF and the PSAP via a single or multiple intermediate nodes.

In the mobile communication system according to the present embodiment, the function for performing the positioning process of the mobile station UE is configured to be provided in the positioning calculation node E-SMLC rather than the radio base station eNB.

Figure 2:
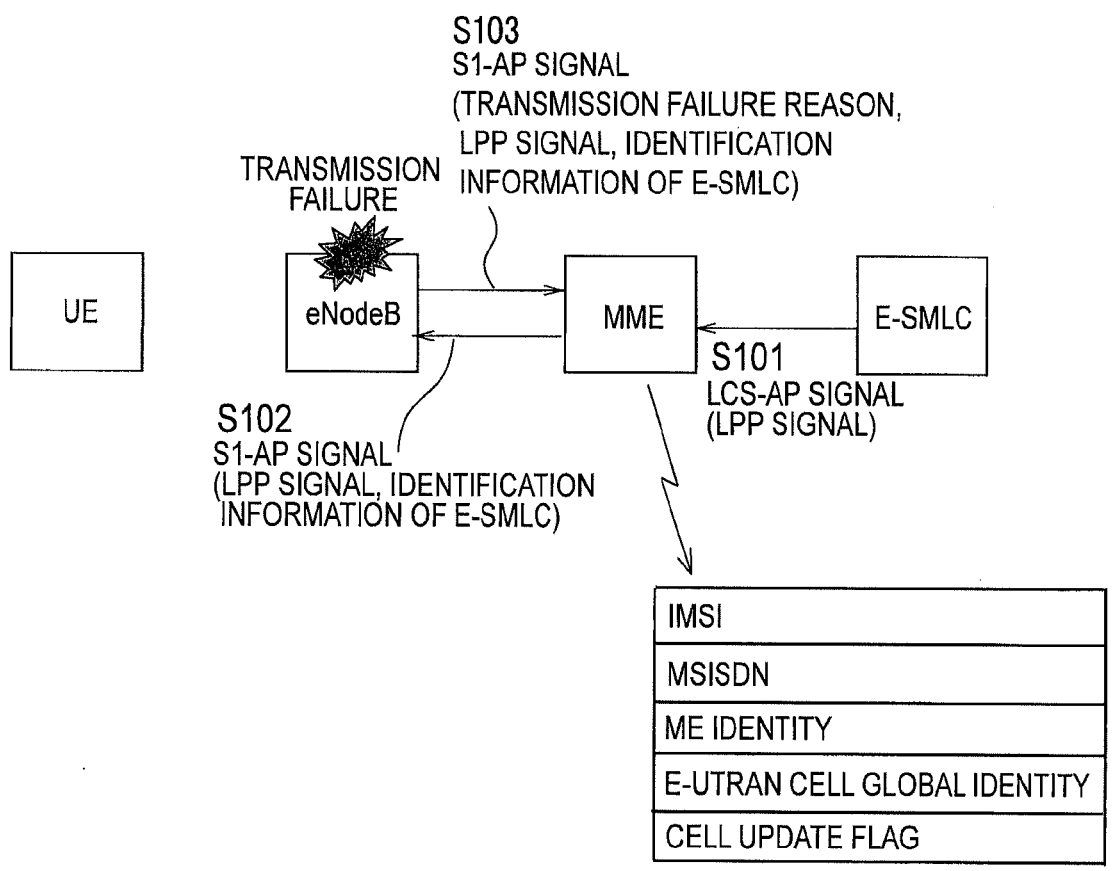
FIG. 2 is a diagram for explaining an operation of the mobile communication system according to the first embodiment of the present invention.

As shown in step S101 of FIG. 2, the mobile management node MME is configured such that when an LPP-AP signal including LPP-PDU (positioning signal, LPP signal) is received from the positioning calculation node E-SMLC, then as shown in step S102 of FIG. 2, the mobile management node MME transmits "S1-AP Downlink NAS Transport", which is an S1-AP signal, (transfer signal) including the LPP-PDU and the identification information of the E-SMLC to the radio base station eNodeB.

Furthermore, as shown in step S103 of FIG. 2, the radio base station eNodeB is configured such that when the radio base station eNodeB transmits a transmission failure notification signal "S1-AP NON DELIVERY INDICATION" including a transmission failure reason (Cause), LPP-PDU which is the data of the LPP signal, and the identification information of the E-SMLC to the mobile management node MME when the radio base station eNodeB fails to transmit LPP-PDU to the mobile station UE, the mobile management node MME transmits the transmission failure reason and the LPP signal included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the transmission failure reason included in the transmission failure notification signal "S1-AP NON DELIVERY INDICATION" received from the radio base station eNodeB indicates either a positioning failure or a handover in progress.

Furthermore, the mobile management node MME is configured to correlate and manage "IMSI", "MSISDN", "ME Identity", "E-UTRAN Cell Global Identity (Cell-ID)", and "Cell Update Flag" as the location-related information of the mobile station UE.

Here, the "Cell Update Flag" is the information indicating whether or not the identification information of the cell in which a mobile station UE exists includes cell identification information (new Cell-ID) that has not been notified to the positioning calculation node E-SMLC.

Figure 3:
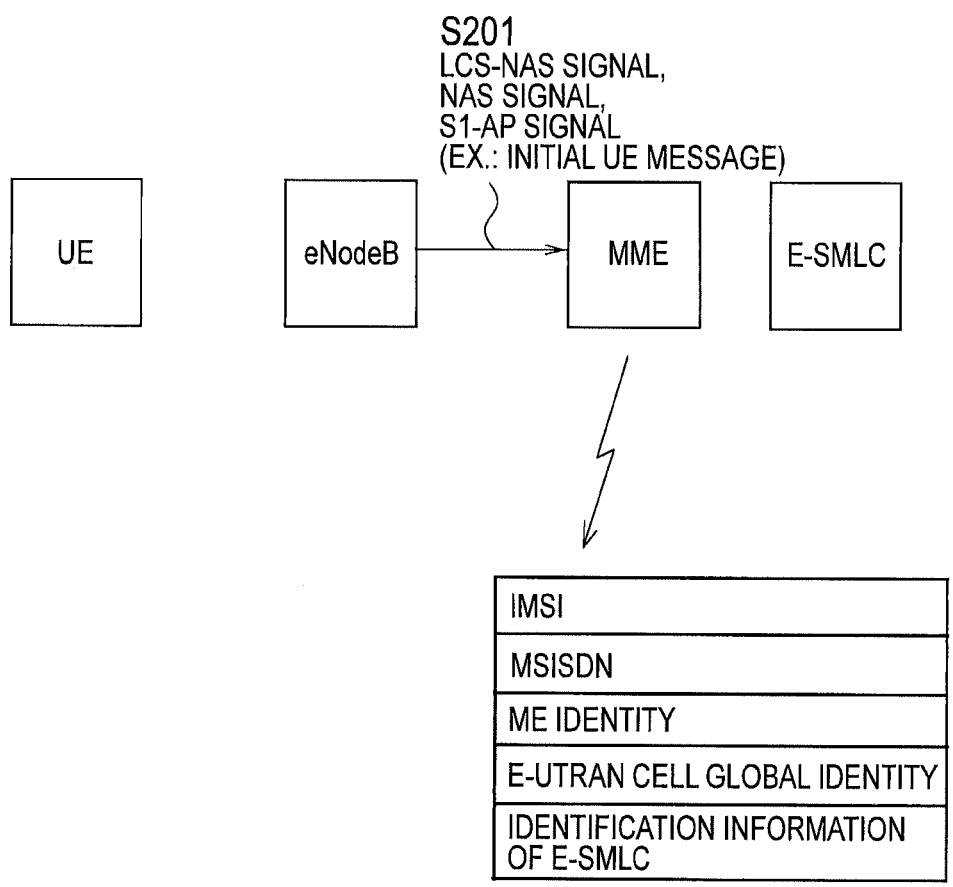
FIG. 3 is a diagram for explaining an operation of the mobile communication system according to the first embodiment of the present invention.
Figure 5:
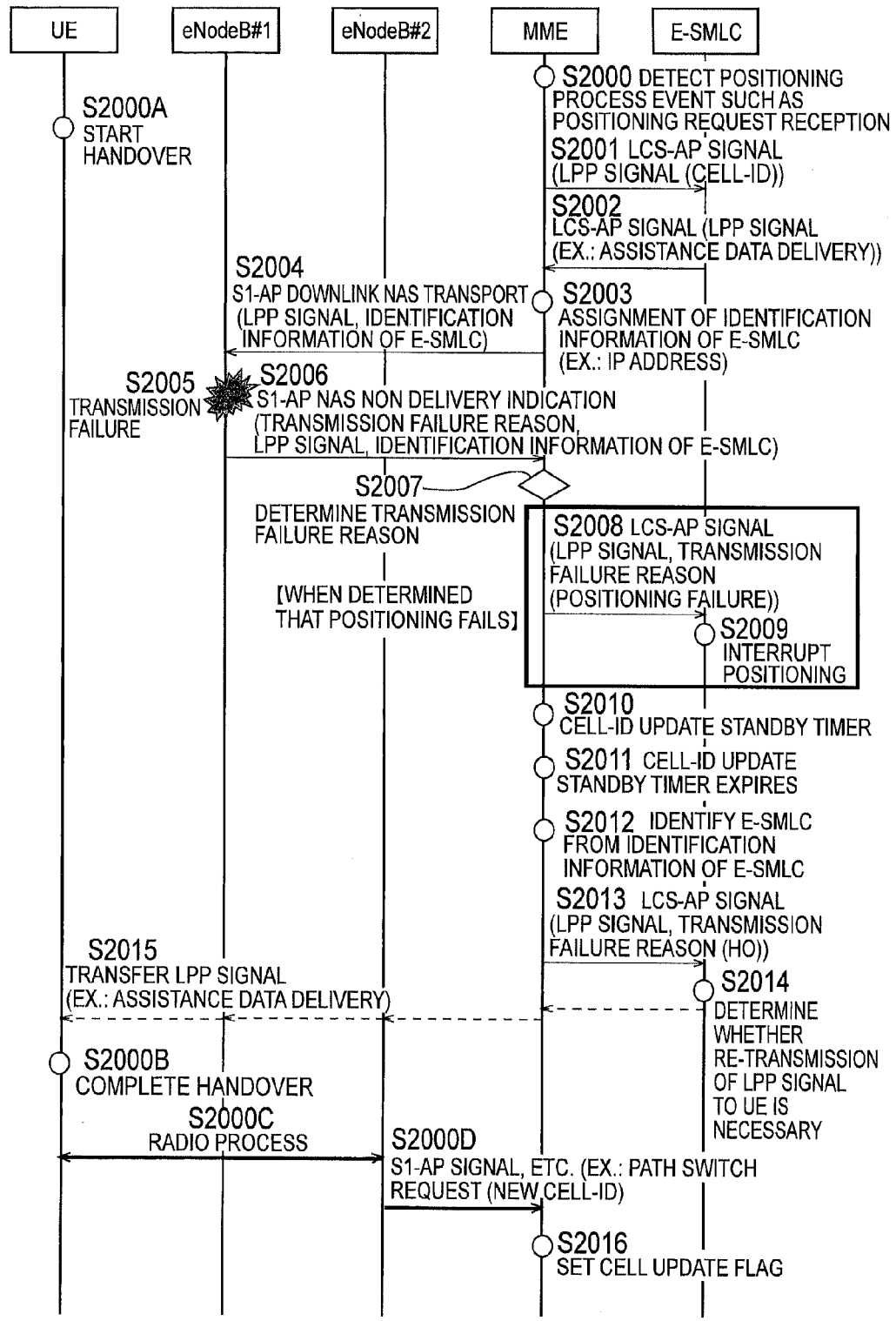
FIG. 5 is a sequence diagram illustrating an operation of the mobile communication system according to the first embodiment of the present invention.

Furthermore, as shown in step S201 of FIG. 3, the mobile management node MME is configured such that when the mobile management node MME receives a predetermined signal for updating a self-retained Cell-ID, that is, an LCS-NAS signal, an NAS signal, and an S1-AP signal (for example, "Initial UE Message"), the mobile management node MME sets "1" to the "Cell Update Flag", and notifies the positioning calculation node E-SMLC of the updated Cell-ID (new Cell-ID) during the next positioning process (for example, when "Location Request" is transmitted) (see FIG. 5 described later).

Note that when the mobile management node MME notifies the positioning calculation node E-SMLC of the updated Cell-ID (new Cell-ID), "0" may also be set to the "Cell Update Flag".

Figure 6:
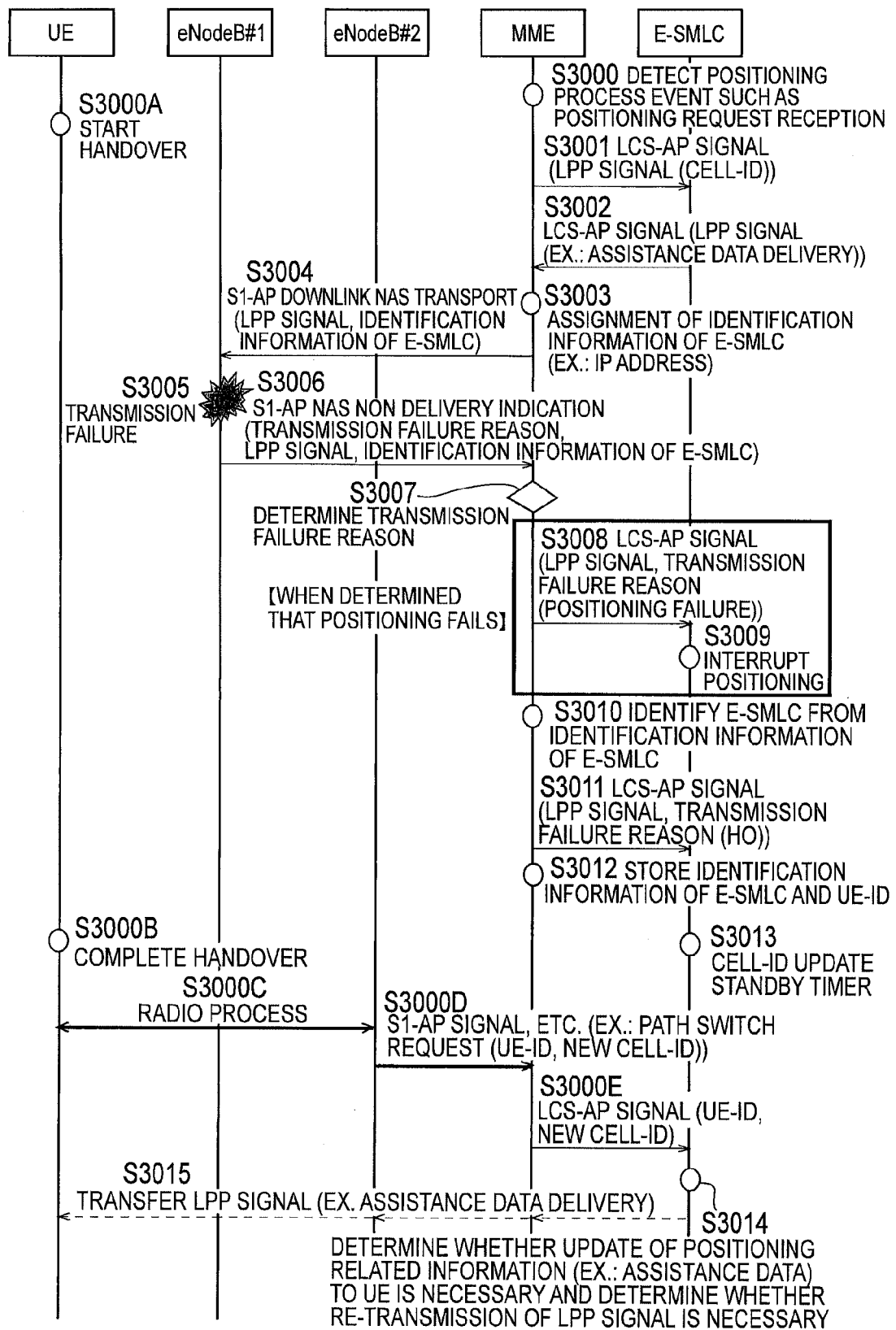
FIG. 6 is a sequence diagram illustrating an operation of the mobile communication system according to the first embodiment of the present invention.

Note that as shown in FIG. 3, the mobile management node MME may also be configured to store the identification information of the E-SMLC included in the transmission failure notification signal "S1-AP NON DELIVERY INDICATION" received from the radio base station eNodeB described in FIG. 2, and when the mobile management node MME receives a predetermined signal for updating the self-retained Cell-ID, the mobile management node MME notifies the positioning calculation node E-SMLC identified by the identification information of the E-SMLC of the updated Cell-ID (new Cell-ID) (see FIG. 6 described later).

Note that the identification information of the E-SMLC may also be information for identifying the IP address of the E-SMLC and other communication sessions.

Hereinafter, an operation of the mobile communication system according to the present embodiment is specifically explained with reference to FIG. 4 through FIG. 7.

Firstly, an operation of a case in which the mobile management node MME receives a predetermined signal including a new Cell-ID before the expiry of a Cell-ID update standby timer in a mobile communication system according to the present embodiment is explained with reference to FIG. 4.

Figure 4:
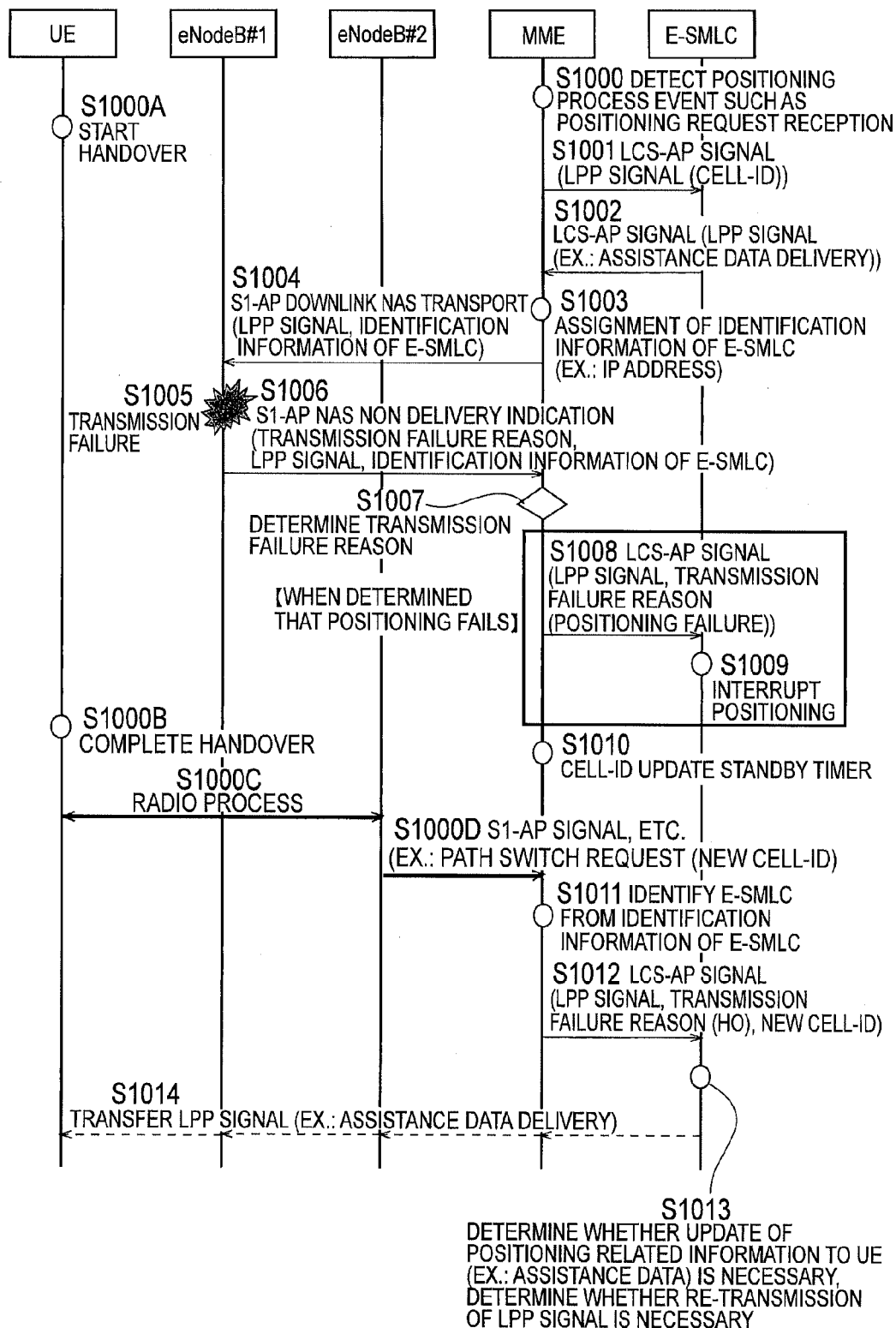
FIG. 4 is a sequence diagram illustrating an operation of the mobile communication system according to the first embodiment of the present invention.

As shown in FIG. 4, in step S1000, when the mobile management node MME detects a positioning process event such as the receipt of a positioning request, the mobile management node MME transmits an LCS-AP signal including an LPP signal (LPP-PDU) that includes the self-retained identification information (Cell-ID) of the cell in which the mobile station UE exists, to the positioning calculation node E-SMLC, in step S1001.

In step S1002, the positioning calculation node E-SMLC transmits the LCS-AP signal including the LPP signal that includes, for example, "Assistance Data" to the mobile management node MME.

In step S1003, the mobile management node MME assigns the identification information of the E-SMLC (for example, the IP address) that identifies the positioning calculation node E-SMLC, and in step S1004, the mobile management node MME transmits the transfer signal "S1-AP Downlink NAS Transport" including the LPP signal and the identification information of the E-SMLC to the radio base station eNodeB #1.

If the radio base station eNodeB #1 fails to transmit the LPP signal to the mobile station UE in step S1005, then in step S1006, the radio base station eNodeB #1 transmits the transmission failure notification signal "S1-AP NON DELIVERY INDICATION" including the transmission failure reason (Cause), the LPP signal, and the identification information of the E-SMLC, to the mobile management node MME.

In step S1007, the mobile management node MME determines the transmission failure reason included in the received transmission failure notification signal "S1-AP NON DELIVERY INDICATION".

If the transmission failure reason indicates a positioning failure, then in step S1008, the mobile management node MME transmits the transmission failure reason and the LPP signal included in the "S1-AP NON DELIVERY INDICATION" to the positioning calculation node E-SMLC identified by the identification information of the E-SMLC included in the transmission failure notification signal "S1-AP NON DELIVERY INDICATION", and in step S1009, the positioning calculation node E-SMLC interrupts the positioning process of the mobile station UE.

On the other hand, because a handover process of the mobile station UE from a cell subordinate to the radio base station eNodeB #1 to a cell subordinate to the radio base station eNodeB #2 is started in step S1000A, if the transmission failure reason indicates that a handover is in progress, the mobile management node MME starts the Cell-ID update standby timer in step S1010.

In the example shown in FIG. 4, the handover process of the mobile station UE from a cell subordinate to the radio base station eNodeB #1 to a cell subordinate to the radio base station eNodeB #2 completes in steps S1000B and S1000C, and the radio base station eNodeB #2 transmits a predetermined signal including the identification information of the handover-destination cell (new Cell-ID), for example, an S1-AP signal (such as "PATH SWITCH REQUEST") to the mobile management node MME, in step S1000D.

Here, because the mobile management node MME receives the S1-AP signal including the new Cell-ID before the expiry of the Cell-ID update standby timer, the mobile management node MME identifies the positioning calculation node E-SMLC in step S1011 based on the identification information of the E-SMLC included in the transmission failure notification signal "S1-AP NON DELIVERY INDICATION" received in step S1006, and then in step S1012, the mobile management node MME transmits the new Cell-ID and an LCS-AP signal including the LPP signal and the transmission failure reason included in the transmission failure notification signal "S1-AP NON DELIVERY INDICATION" received in step S1006, to the positioning calculation node E-SMLC.

In steps S1013 and S1014, if necessary, the positioning calculation node E-SMLC updates and retransmits the LPP signal based on the new Cell-ID included in the received LCS-AP signal.

Secondly, an operation of a case in which the mobile management node MME does not receive a predetermined signal including a new Cell-ID before the expiry of the Cell-ID update standby timer in the mobile communication system according to the present embodiment is explained with reference to FIG. 5.

As shown in FIG. 5, the operation of steps S2000 through S2010 is the same as the operation of steps 51000 through 51010 shown in FIG. 4.

Here, in step S2011, because the Cell-ID update standby timer expires without the receipt of a predetermined signal including a new Cell-ID by the mobile management node MME, that is, without the completion of the handover process of the mobile station UE from a cell subordinate to the radio base station eNodeB #1 to a cell subordinate to the radio base station eNodeB #2, the mobile management node MME identifies the positioning calculation node E-SMLC in step S2012 based on the identification information of the E-SMLC included in the transmission failure notification signal "S1-AP NON DELIVERY INDICATION" received in step S2006, and then in step S2013, the mobile management node MME transmits an LCS-AP signal including the LPP signal and the transmission failure reason included in the transmission failure notification signal "S1-AP NON DELIVERY INDICATION" received in step S2006 to the positioning calculation node E-SMLC.

In steps S2014 and S2015, if necessary, the positioning calculation node E-SMLC updates and retransmits the LPP signal based on the new Cell-ID included in the received LCS-AP signal.

Following this, the handover process of the mobile station UE from a cell subordinate to the radio base station eNodeB #1 to a cell subordinate to the radio base station eNodeB #2 completes in steps S2000B and S2000C, and the radio base station eNodeB #2 transmits a predetermined signal including the identification information of the handover-destination cell (new Cell-ID), for example, an S1-AP signal (such as "PATH SWITCH REQUEST") to the mobile management node MME, in step S2000D.

Here, because the mobile management node MME receives the S1-AP signal including the new Cell-ID after the Cell-ID update standby timer has expired, in step S2016, the mobile management node MME sets "1" to the "Cell Update Flag" without notifying the positioning calculation node E-SMLC of the new Cell-ID, and notifies the positioning calculation node E-SMLC of the updated Cell-ID (new Cell-ID) during the next positioning process (for example, when "Location Request" is transmitted, or when LPP signal requesting the "Assistance Data" from the mobile station UE to the positioning calculation node E-SMLC is transferred).

Thirdly, an operation of another case in which the mobile management node MME receives a predetermined signal including a new Cell-ID before the expiry of the Cell-ID update standby timer in the mobile communication system according to the present embodiment is explained with reference to FIG. 6.

As shown in FIG. 6, the operation of steps S3000 through S3009 is the same as the operation of steps S1000 through S1009 shown in FIG. 4.

The mobile management node MME identifies the positioning calculation node E-SMLC in step S3010 based on the identification information of the E-SMLC included in the transmission failure notification signal "S1-AP NON DELIVERY INDICATION" received in step S3006, and then in step S3011, the mobile management node MME transmits an LCS-AP signal including the LPP signal and the transmission failure reason included in the transmission failure notification signal "S1-AP NON DELIVERY INDICATION" received in step S3006 to the positioning calculation node E-SMLC, and in step S3012, the mobile management node MME correlates and stores the identification information of the mobile station UE (UE-ID) and the identification information of the E-SMLC.

In step S3013, the positioning calculation node E-SMLC starts the Cell-ID update standby timer upon receiving the LCS-AP signal.

Following this, the handover process of the mobile station UE from a cell subordinate to the radio base station eNodeB #1 to a cell subordinate to the radio base station eNodeB #2 completes in steps S3000B and S3000C, and the radio base station eNodeB #2 transmits a predetermined signal including the identification information of the handover-destination cell (new Cell-ID) and the identification information of the mobile station UE (UE-ID (for example, IMSI)), for example, an S1-AP signal (such as "PATH SWITCH REQUEST") to the mobile management node MME, in step S3000D.

In step S3000E, the mobile management node MME transmits the identification information of the mobile station UE (UE-ID) included in the S1-AP signal and the LCS-AP signal including the new Cell-ID to the positioning calculation node E-SMLC identified by the identification information of the E-SMLC that is correlated to the identification information of the mobile station UE (UE-ID) included in the received S1-AP signal.

In steps S3014 and S3015, if necessary, the positioning calculation node E-SMLC updates and retransmits the LPP signal based on the new Cell-ID included in the received LCS-AP signal.

Fourthly, an operation of another case in which the mobile management node MME receives a predetermined signal including a new Cell-ID before the expiry of the Cell-ID update standby timer in the mobile communication system according to the present embodiment is explained with reference to FIG. 7.

Figure 7:
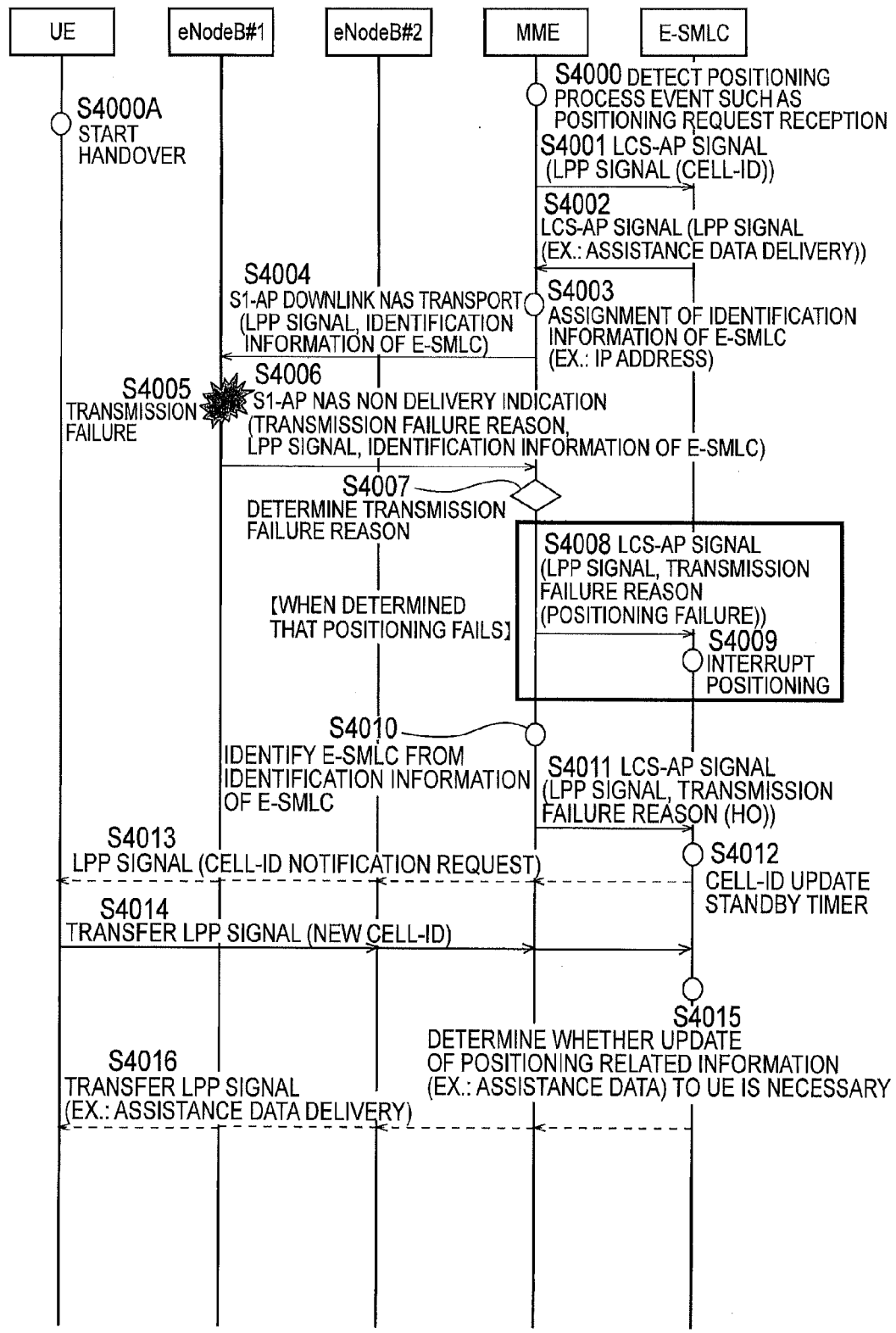
FIG. 7 is a sequence diagram illustrating the operation of the mobile communication system according to the first embodiment of the present invention.
Figure 8:
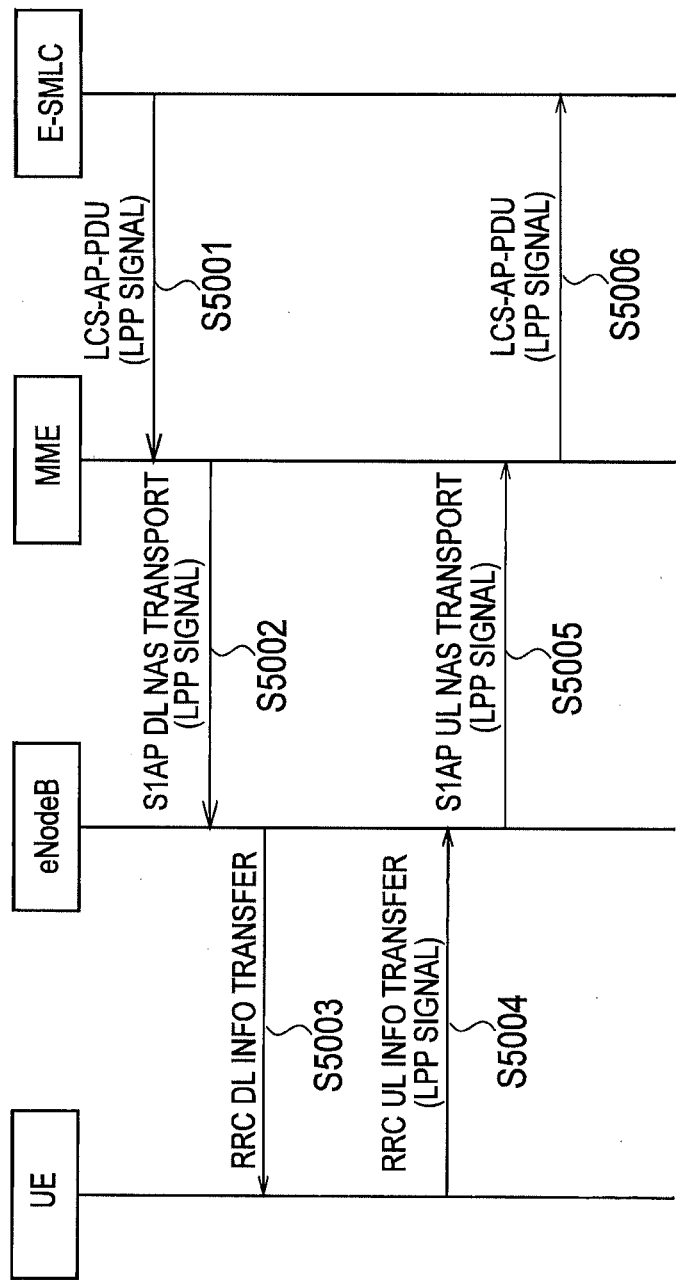
FIG. 8 is a sequence diagram illustrating an operation of a conventional mobile communication system.

As shown in FIG. 7, the operation of steps S4000 through S4011 is the same as the operation of steps S3000 through S3011 shown in FIG. 6.

In step S4012, the positioning calculation node E-SMLC starts the Cell-ID update standby timer, and in step S4013, the positioning calculation node E-SMLC transmits an LPP signal including a Cell-ID notification request requesting the notification of the identification information (new Cell-ID) of a handover-destination cell to the mobile station UE via the mobile management node MME and the radio base station eNodeB #2.

In step S4014, because the mobile station UE detects that the handover process of the mobile station UE from a cell subordinate to the radio base station eNodeB #1 to a cell subordinate to the radio base station eNodeB #2 is in progress, the mobile station UE transmits an LPP signal including the identification information (new Cell-ID) of the handover destination cell via the radio base station eNodeB #2 and the mobile management node MME, depending on the Cell-ID notification request.

In steps S4015 and S4016, if necessary, the positioning calculation node E-SMLC updates and retransmits the LPP signal based on the new Cell-ID included in the received LCS-AP signal.

According to the mobile communication system of the first embodiment of the present invention, even when a handover by the mobile station UE over a radio base station eNodeB is performed during a positioning process of the mobile station UE, an LPP signal (LPP-PDU) can be retransmitted efficiently.

Furthermore, according to the mobile communication system of the first embodiment of the present invention, when retransmitting the LPP signal, the LPP signal can be updated appropriately based on the Cell-ID of the handover destination.

The characteristics of the present embodiment as described above may be expressed as follows.

A first characteristic of the present embodiment is summarized as a mobile communication method including: a step of transmitting, by a positioning calculation node E-SMLC, an LPP signal (positioning signal) through an LCS-AP signal to a mobile management node MME; a step of transmitting, by the mobile management node MME, a transfer signal "S1-AP Downlink NAS Transport" including the LPP signal and the identification information of the E-SMLC (identification information of the positioning calculation node) to a radio base station eNodeB #1; a step of transmitting, by the radio base station eNodeB #1, a transmission failure notification signal "S1-AP NON DELIVERY INDICATION" including a transmission failure reason, the LPP signal that could not be transmitted, and the identification information of the E-SMLC to the mobile management node MME, when the radio base station eNodeB #1 fails to transmit a radio signal including the LPP signal to the mobile station UE; and a step of transmitting, by the mobile management node MME, by using the LCS-AP signal, the transmission failure reason and the LPP signal, which could not be transmitted, included in the "S1-AP NON DELIVERY INDICATION" signal to the positioning calculation node E-SMLC identified by the identification information of the E-SMLC included in the transmission failure notification signal "S1-AP NON DELIVERY INDICATION", when the transmission failure reason included in the transmission failure notification signal "S1-AP NON DELIVERY INDICATION" received by the mobile management node MME indicates a positioning failure.

A second characteristic of the present embodiment is summarized as a mobile management node MME configured to transmit a transfer signal "S1-AP Downlink NAS Transport" including an LPP signal received from a positioning calculation node E-SMLC through an LCS-AP signal, and the identification information of the E-SMLC to a radio base station eNodeB, and also configured to transmit, by using the LCS-AP signal, a transmission failure reason and the LPP signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the transmission failure reason included in the transmission failure notification signal "S1-AP NON DELIVERY INDICATION" received from the radio base station eNodeB indicates a positioning failure.

A third characteristic of the present embodiment is summarized as a mobile communication method including: a step of transmitting, by a positioning calculation node E-SMLC, an LPP signal through an LCS-AP signal to a mobile management node MME; a step of transmitting, by the mobile management node MME, a transfer signal "S1-AP Downlink NAS Transport" including the LPP signal and the identification information of the E-SMLC to a radio base station eNodeB #1 (first radio base station); a step of transmitting, by the radio base station eNodeB #1, a transmission failure notification signal "S1-AP NON DELIVERY INDICATION" including a transmission failure reason, the LPP signal that could not be transmitted, and the identification information of the E-SMLC to the mobile management node MME, when the radio base station eNodeB #1 fails to transmit the LPP signal to the mobile station UE; a step of starting a Cell-ID update standby timer (predetermined timer) by the mobile management node MME when the transmission failure reason included in the transmission failure notification signal "S1-AP NON DELIVERY INDICATION" received by the mobile management node MME indicates that a handover is in progress; and a step of transmitting, by the mobile management node MME, by using the LCS-AP signal, the identification information of a handover-destination cell and the transmission failure reason and the LPP signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the mobile management node MME receives a predetermined signal (for example, "PATH SWITCH REQUEST") including the identification information of the handover-destination cell from a radio base station eNodeB #2 (second radio base station) before the expiry of the Cell-ID update standby timer.

A fourth characteristic of the present embodiment is summarized as a mobile management node MME configured to transmit a transfer signal "S1-AP Downlink NAS Transport" including an LPP signal received from a positioning calculation node E-SMC through an LCS-AP signal and the identification information of the E-SMLC to a radio base station eNodeB #1, and configured to start a Cell-ID update standby timer when a transmission failure reason included in a transmission failure notification signal "S1-AP NON DELIVERY INDICATION" received from the radio base station eNodeB #1 indicates that a handover is in progress, and also configured to transmit, by using an LCS-AP signal, the identification information of a handover-destination cell and the transmission failure reason and the LPP signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when a predetermined signal (for example, "PATH SWITCH REQUEST") including the identification information of the handover-destination cell (new Cell-ID) is received from a radio base station eNodeB #2 before the expiry of the Cell-ID update standby timer.

A fifth characteristic of the present embodiment is summarized as a mobile communication method including: a step of transmitting, by a positioning calculation node E-SMLC, an LPP signal through an LCS-AP signal to a mobile management node MME; a step of transmitting, by the mobile management node MME, a transfer signal "S1-AP Downlink NAS Transport" including the LPP signal and the identification information of the E-SMLC to a radio base station eNodeB #1; a step of transmitting, by the radio base station eNodeB #1, a transmission failure notification signal "S1-AP NON DELIVERY INDICATION" including a transmission failure reason, the LPP signal that could not be transmitted, and the identification information of the E-SMLC to the mobile management node MME, when the radio base station eNodeB #1 fails to transmit the LPP signal to the mobile station UE; a step of starting a Cell-ID update standby timer by the mobile management node MME when the transmission failure reason included in the transmission failure notification signal "S1-AP NON DELIVERY INDICATION" received by the mobile management node MME indicates that a handover is in progress; a step of transmitting, by the mobile management node MME, by using the LCS-AP signal, the transmission failure reason and the LPP positioning signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the Cell-ID update standby timer expires before the mobile management node MME receives a predetermined signal (for example, "PATH SWITCH REQUEST") including the identification information of a handover-destination cell from a radio base station eNodeB #2; and a step of updating, by the mobile management node MME, the retained identification information of the handover-destination cell and storing information "Cell Update Flag" indicating the same, without notifying the positioning calculation node E-SMLC of the identification information of the handover-destination cell, when the mobile management node MME receives a predetermined signal (for example, "PATH SWITCH REQUEST") including the identification information of the handover-destination cell (new Cell-ID) from the radio base station eNodeB #2 after the expiry of the Cell-ID update standby timer.

A sixth characteristic of the present embodiment is summarized as a mobile management node MME configured to transmit a transfer signal "S1-AP Downlink NAS Transport" including an LPP signal received from a positioning calculation node E-SMLC through an LCS-AP signal and the identification information of the E-SMLC to a radio base station eNodeB #1, and configured to start a Cell-ID update standby timer when a transmission failure reason included in a transmission failure notification signal "S1-AP NON DELIVERY INDICATION" received from the radio base station eNodeB #1 indicates that a handover is in progress, and configured to transmit, by using the LCS-AP signal, the transmission failure reason and the LPP signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the Cell-ID update standby timer expires before a predetermined signal (for example, "PATH SWITCH REQUEST") including the identification information of a handover-destination cell (new Cell-ID) is received from a radio base station eNodeB #2, and also configured to update the retained identification information of the handover-destination cell and also store information "Cell Update Flag" indicating the same, without notifying the positioning calculation node E-SMLC of the identification information of the handover-destination cell, when a predetermined signal (for example, "PATH SWITCH REQUEST") including the identification information of the handover-destination cell (new Cell-ID) is received from the radio base station eNodeB #2 after the expiry of the Cell-ID update standby timer.

A seventh characteristic of the present embodiment is summarized as a mobile communication method including: a step of transmitting, by a positioning calculation node E-SMLC, an LPP signal through an LCS-AP signal to a mobile management node MME; a step of transmitting, by the mobile management node MME, a transfer signal "S1-AP Downlink NAS Transport" including the LPP signal and the identification information of the E-SMLC to a radio base station eNodeB #1; a step of transmitting, by the radio base station eNodeB #1, a transmission failure notification signal "S1-AP NON DELIVERY INDICATION" including a transmission failure reason, the LPP signal, the identification information of the E-SLMC, and the LPP signal that could not be transmitted to the mobile management node MME, when the radio base station eNodeB #1 fails to transmit the LPP signal to the mobile station UE; a step of transmitting, by the mobile management node MME, by using the LCS-AP signal, the transmission failure reason and the LPP signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the transmission failure reason included in the transmission failure notification signal "S1-AP NON DELIVERY INDICATION" received by the mobile management node MME indicates that a handover is in progress; a step of starting a Cell-ID update standby timer (predetermined timer) by the positioning calculation node E-SMLC when the positioning calculation node E-SMLC receives the LCS-AP signal including the transmission failure reason and the LPP signal, which could not be transmitted, from the mobile management node MME; and a step of transmitting, by the positioning calculation node E-SMLC, an LPP positioning signal corresponding to the identification information of a handover-destination cell to the mobile management node MME, when the positioning calculation node E-SMLC receives an LCS-AP signal including the identification information of the handover-destination cell (new Cell-ID) from a radio base station eNodeB #2 by way the mobile management node MME, before the expiry of the Cell-ID update standby timer.

An eighth characteristic of the present embodiment is summarized as a positioning calculation node E-SMLC configured to transmit an LPP signal through an LCS-AP signal to a mobile management node MME, and configured to start a Cell-ID update standby timer when a transmission failure reason and the LPP signal, which could not be transmitted, included in a transmission failure notification signal "S1-AP NON DELIVERY INDICATION" transmitted to the mobile management node MME when the radio base station eNodeB #1 fails to transmit the LPP signal to the mobile station UE are received from the mobile management node MME, and also configured to transmit an LPP signal corresponding to the identification information of a handover-destination cell to the mobile management node MME, when an LCS-AP signal including the identification information of the handover-destination cell (new Cell-D) is received from the radio base station eNodeB #2 by way of the mobile management node MME before the expiry of the Cell-ID update standby timer.

A ninth characteristic of the present embodiment is summarized as a mobile communication method including: a step of transmitting, by a positioning calculation node E-SMLC, an LPP signal through an LCS-AP signal to a mobile management node MME; a step of transmitting, by the mobile management node MME, a transfer signal "S1-AP Downlink NAS Transport" including the LPP signal and the identification information of the E-SMLC to a radio base station eNodeB #1; a step of transmitting, by the radio base station eNodeB #1, a transmission failure notification signal "S1-AP NON DELIVERY INDICATION" including a transmission failure reason, the LPP signal, and the identification information of the E-SMLC to the mobile management node MME, when the radio base station eNodeB #1 fails to transmit the LPP signal to the mobile station UE; and a step of transmitting, by the mobile management node MME, the LCS-AP signal including a transmission failure reason and the LPP signal, which could not be transmitted, included in the transmission failure notification signal "S1-AP NON DELIVERY INDICATION" to the positioning calculation node E-SMLC identified by the identification information of the E-SMLC included in the transmission failure notification signal "S1-AP NON DELIVERY INDICATION", when the transmission failure reason included in the transmission failure notification signal "S1-AP NON DELIVERY INDICATION" received by the mobile management node MME indicates that a handover is in progress; and a step of transmitting, by the positioning calculation node E-SMLC, a notification request requesting the notification of the identification information of a handover-destination cell (new Cell-ID) to the mobile station UE, when the positioning calculation node E-SMLC receives the LCS-AP signal including the transmission failure reason and the positioning signal from the mobile management node MME.

A tenth characteristic of the present embodiment is summarized as a positioning calculation node E-SMLC configured to transmit an LPP signal through an LCS-AP signal to a mobile management node MME, and also configured to transmit a notification request requesting the notification of identification information of a handover-destination cell (new Cell-ID) to a mobile station UE when a transmission failure reason and the LPP signal, which could not be transmitted, included in a transmission failure notification signal "S1-AP NON DELIVERY INDICATION" transmitted to the mobile management node MME when the radio station eNodeB #1 fails to transmit the LPP signal to the mobile station UE are received from the mobile management node MME.

An eleventh characteristic of the present embodiment is summarized as a mobile station UE configured such that when the mobile station UE detects a handover from a first cell subordinate to a radio base station eNodeB #1 to a second cell subordinate to a radio base station eNodeB #2, and when the mobile station UE receives a notification request requesting the notification of the identification information of a handover-destination cell (new Cell-ID) from a positioning calculation node E-SMLC, the mobile station UE notifies the positioning calculation node E-SMLC of the identification information of the second cell (new Cell-ID).

Note that the mobile station UE may also be configured to notify the positioning calculation node E-SMLC of the identification information of the second cell (new Cell-ID) at all times, when the mobile station UE detects a handover from a first cell subordinate to a radio base station eNodeB #1 to a second cell subordinate to a radio base station eNodeB #2 while a location information service is being executed.

In addition, the operation of the above-mentioned the mobile station UE, radio base station eNode B, the mobile management node MME or the node E-SMLC may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the mobile station UE, radio base station eNode B, the mobile management node MME or the node E-SMLC. As a discrete component, such storage medium and processor may be arranged in the mobile station UE, radio base station eNode B, the mobile management node MME or the node E-SMLC.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method, a mobile management node, a positioning calculation node, and a mobile station that can eliminate the problems when a handover by a mobile station UE over a radio base station eNodeB is performed during a positioning process of the mobile station UE.

The invention claimed is:

1. A mobile communication method, comprising:
a step of transmitting, by a positioning calculation node, a positioning signal to a mobile management node;
a step of transmitting, by the mobile management node, a transfer signal including the positioning signal and the identification information of the positioning calculation node to a first radio base station;
a step of transmitting, by the first radio base station, a transmission failure notification signal including a transmission failure reason, the positioning signal, and the identification information of the positioning calculation node to the mobile management node, when the first radio base station fails to transmit the positioning signal to the mobile station;
a step of starting, by the mobile management node, a predetermined timer when the transmission failure reason included in the transmission failure notification signal received by the mobile management node indicates that a handover is in progress;
a step of transmitting, by the mobile management node, the identification information of a handover-destination cell and the transmission failure reason and the positioning signal included in the transmission failure notification signal to the positioning calculation node identified by the identification information of the positioning calculation node included in the transmission failure notification signal, when the mobile management node receives a predetermined signal including the identification information of the handover-destination cell from a second radio base station before the expiry of the predetermined timer; and
a step of updating, by the mobile management node, the identification information of the handover-destination cell and also storing information indicating the same, without notifying the positioning calculation node of the identification information of the handover-destination cell, when the mobile management node receives a predetermined signal including the identification information of the handover-destination cell from the second radio base station after the expiry of the predetermined timer.

2. A mobile communication method, comprising:
a step of transmitting, by a positioning calculation node, a positioning signal to a mobile management node;
a step of transmitting, by the mobile management node, a transfer signal including the positioning signal and the identification information of the positioning calculation node to a first radio base station;
a step of transmitting, by the first radio base station, a transmission failure notification signal including a transmission failure reason, the positioning signal, and the identification information of the positioning calculation node to the mobile management node, when the first radio base station fails to transmit the positioning signal to a mobile station;
a step of starting, by the mobile management node, a predetermined timer when the transmission failure reason included in the transmission failure notification signal received by the mobile management node indicates that a handover is in progress; and a step of transmitting, by the mobile management node, the transmission failure reason and the positioning signal included in the transmission failure notification signal to the positioning calculation node identified by the identification information of the positioning calculation node included in the transmission failure notification signal, when the predetermined timer expires before the mobile management node receives a predetermined signal including the identification information of a handover-destination cell from a second radio base station; and a step of updating, by the mobile management node, the retained identification information of the handover-destination cell and also storing information indicating the same, without notifying the positioning calculation node of the identification information of the handover-destination cell, when the mobile management node receives a predetermined signal including the identification information of the handover-destination cell from the second radio base station after the expiry of the predetermined timer.

3. A mobile management node configured to:

receive, from a positioning calculation node, a transfer signal including a positioning signal;

transmit the transfer signal including the positioning signal and identification information of the positioning calculation node to a first radio base station;

receive, from the first radio base station, the transmission failure reason and the positioning signal included in the transmission failure notification signal;

start a predetermined timer is when a transmission failure reason included in a transmission failure notification signal received from the first radio base station indicates that a handover is in progress; and transmit the transmission failure reason and the positioning signal included in the transmission failure notification signal to the positioning calculation node identified by the identification information of the positioning calculation node included in the transmission failure notification signal, when the predetermined timer expires before a predetermined signal including the identification information of a handover-destination cell is received from a second radio base station, and update the retained identification information of the handover-destination cell and information indicating the same is stored, without notifying the positioning calculation node of the identification information of the handover-destination cell, when a predetermined signal including the identification information of the handover-destination cell is received from the second radio base station after the expiry of the predetermined timer.

4. A mobile communication method, comprising:

a step of transmitting, by a positioning calculation node, a positioning signal to a mobile management node;

a step of transmitting, by the mobile management node, a transfer signal including the positioning signal and the identification information of the positioning calculation node to a first radio base station;

a step of transmitting, by the first radio base station, a transmission failure notification signal including a transmission failure reason, the positioning signal, and the identification information of the positioning calculation node to the mobile management node, when the first radio base station fails to transmit the positioning signal to a mobile station;

a step of transmitting, by the mobile management node, the transmission failure reason and the positioning signal included in the transmission failure notification signal to the positioning calculation node identified by the identification information of the positioning calculation node included in the transmission failure notification signal, when the transmission failure reason included in the transmission failure notification signal received by the mobile management node indicates that a handover is in progress;

a step of starting, by the positioning calculation node, a predetermined timer when the positioning calculation node receives the transmission failure reason and the positioning signal from the mobile management node; and a step of transmitting, by the positioning calculation node, a positioning signal corresponding to the identification information of a handover-destination cell to the mobile management node, when the positioning calculation node receives the identification information of the handover-destination cell from a second radio base station by way of the mobile management node, before the expiry of the predetermined timer.

5. A positioning calculation node configured to:

transmit a positioning signal to a mobile management node, wherein the mobile management node transmits a transfer signal including the positioning signal and the identification information of the positioning calculation node to a first radio base station, and wherein the first radio base station transmits a transmission failure notification signal including a transmission failure reason, the positioning signal, and the identification information of the positioning calculation node to the mobile management node, when the first radio base station fails to transmit the positioning signal to a mobile station;

receive, from the mobile management node, the transmission failure reason and the positioning signal included in the transmission failure notification signal, when the transmission failure reason included in the transmission failure notification signal received by the mobile management node indicates that a handover is in progress;

start a predetermined timer when a transmission failure reason and the positioning signal included in a transmission failure notification signal transmitted to the mobile management node when the first radio base station fails to transmit the positioning signal to the mobile station are received from the mobile management node, and transmit a positioning signal corresponding to the identification information of a handover-destination cell to the mobile management node, when the identification information of the handover-destination cell is received from the second radio base station by way of the mobile management node before the expiry of the predetermined timer.

* * * * *